UNITED STATES PATENT OFFICE.

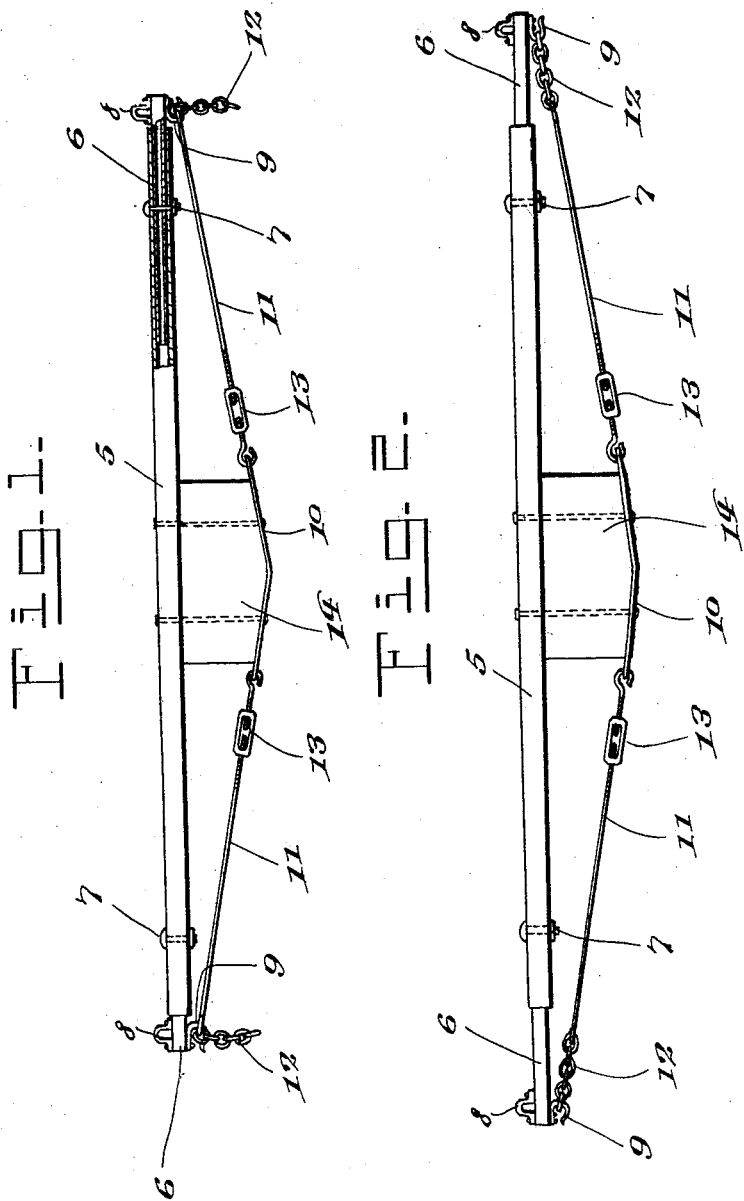

JOHN R. MOORE, OF PLAINS, KANSAS.

DRAFT APPLIANCE.

1,394,858.  Specification of Letters Patent.  Patented Oct. 25, 1921.

Application filed February 24, 1921. Serial No. 447,473.

*To all whom it may concern:*

Be it known that I, JOHN R. MOORE, a citizen of the United States, residing at Plains, in the county of Meade and State of Kansas, have invented new and useful Improvements in Draft Appliances, of which the following is a specification.

This invention relates to draft appliances for horse-drawn vehicles, and more particularly to the crosstrees to which the draft animals are attached.

The invention has for its object to provide an appliance of the kind stated which is adjustable as to length to accommodate different numbers of draft animals traveling abreast, and also to provide a very strong and durable appliance.

The object stated is attained by means of a novel combination and arrangement of parts to be hereinfter described and claimed, and in order that the same may be better understood, reference is had to the accompanying drawing, forming a part of this specification.

In the drawing,

Figure 1 is an elevation of the appliance, partly in section, and Fig. 2, is a similar view showing the appliance adjusted to accommodate a larger number of horses.

Referring specifically to the drawing, the appliance consists of a straight tubular bar 5 of sufficient length to serve as a doubletree, and in order that it may be lengthened, it carries at each end a telescoping section 6 which is held stationary by a bolt 7 passing through a vertical aperture in the bar and through one of a plurality of apertures in the adjustable end section. The last-mentioned apertures are provided in order that the end section may be drawn out to project different distances from the end of the main bar according to the desired length the appliance is to have.

The outer end of each extension section 6 carries a suitable hitch device 8 on top, and on its under side it is fitted with a hook 9.

In order that the appliance may successfully resist the strains to which it is subjected, it is provided with a truss extending between the outer ends of the adjustable sections 6. This truss comprises a center plate 10 to which are connected oppositely extending rods 11 fitted with chains 12 at their outer ends for detachable connections with the hooks 9. The connections between the rods 10 and 11 are made by turn buckles 13 so that the necessary tension may be obtained. The center plate 10 seats beneath and is secured to a block 14 rigidly fastened to the main bar 5 at the bottom thereof, and midway between its ends. The chains 12 provide a quick detachable and adjustable connection betwen the trust and the sections 6, and the turnbuckles enable the truss rods to be drawn tight after their connection with sections.

The appliance is very simple, and it is also strong and durable, and it effectually serves the purpose for which it has been designed.

I claim:

1. A draft-tree comprising a tubular main bar, extension sections slidably mounted in the ends of said bar, means for locking the extension sections, a block mounted on the bottom of the main bar intermediate its ends, and a truss extending across said block and having adjustable connection at its ends with the extension sections.

2. A draft-tree comprising a main bar, longitudinally adjustable end sections carried thereby, means for locking the end sections to the main bar, and a truss having adjustable connections at its ends with the end sections.

3. A draft-tree comprising a main bar, longitudinally adjustable end sections carried thereby, means for locking the end sections to the main bar, a block mounted on the bottom of the main bar intermediate its ends, a truss member carried by the block, rods extending in opposite directions from the ends of the truss member, and detachably and adjustably connected at their outer ends to the aforesaid end sections, and tensioning connections between said rods and the truss member.

In testimony whereof I affix my signature.

JOHN R. MOORE.